United States Patent [19]

Miwa et al.

[11] Patent Number: 4,791,500
[45] Date of Patent: Dec. 13, 1988

[54] METHOD AND APPARATUS FOR WRITING INFORMATION ON MAGNETIC DISK WITH SINGLE-GAP MAGNETIC HEAD

[75] Inventors: Takahiro Miwa, Konan; Hiroshi Nishikawa, Nagoya, both of Japan

[73] Assignee: Brother Kogyo Kabushikik Kaisha, Nagoya, Japan

[21] Appl. No.: 942,072

[22] Filed: Dec. 15, 1986

[30] Foreign Application Priority Data

Dec. 18, 1985 [JP] Japan .............................. 60-285209
Dec. 18, 1985 [JP] Japan .............................. 60-285211

[51] Int. Cl.$^4$ ........................ G11B 15/04; G11B 5/03
[52] U.S. Cl. ........................................ 360/60; 360/66
[58] Field of Search .............................. 360/60, 66, 77

[56] References Cited

U.S. PATENT DOCUMENTS 4,290,088 9/1981 Beecroft .............................. 360/66
4,644,421 2/1987 Miwa et al. .......................... 360/66

Primary Examiner—Vincent P. Canney
Attorney, Agent, or Firm—Parkhurst, Oliff & Berridge

[57] ABSTRACT

A method of writing information on a magnetic disk having a multiplicity of concentric recording tracks on a recording surface thereof, each track having sectors each of which includes a sector-identification field, and a data field on which the information is written. Initially, a magnetic head is positioned at a first erase position away from a centerline of selected one of the tracks by a predetermined distance in one of radially inward and outward directions of the disk. After reading the sector-identification field of selected one of the sectors of the selected track, the magnetic head is activated to perform a first erasing operation on the data field of the selected sector. Then, the head is moved to a second erase position away from the centerline by a predetermined distance in the other radial direction, and is activated to perform a second erasing operation on the same data field, after the sector-identification field has been raised. The head is then moved to the centerline of the selected track, and activated to write the information on the erased data field, after the sector-identification field has been read.

10 Claims, 13 Drawing Sheets

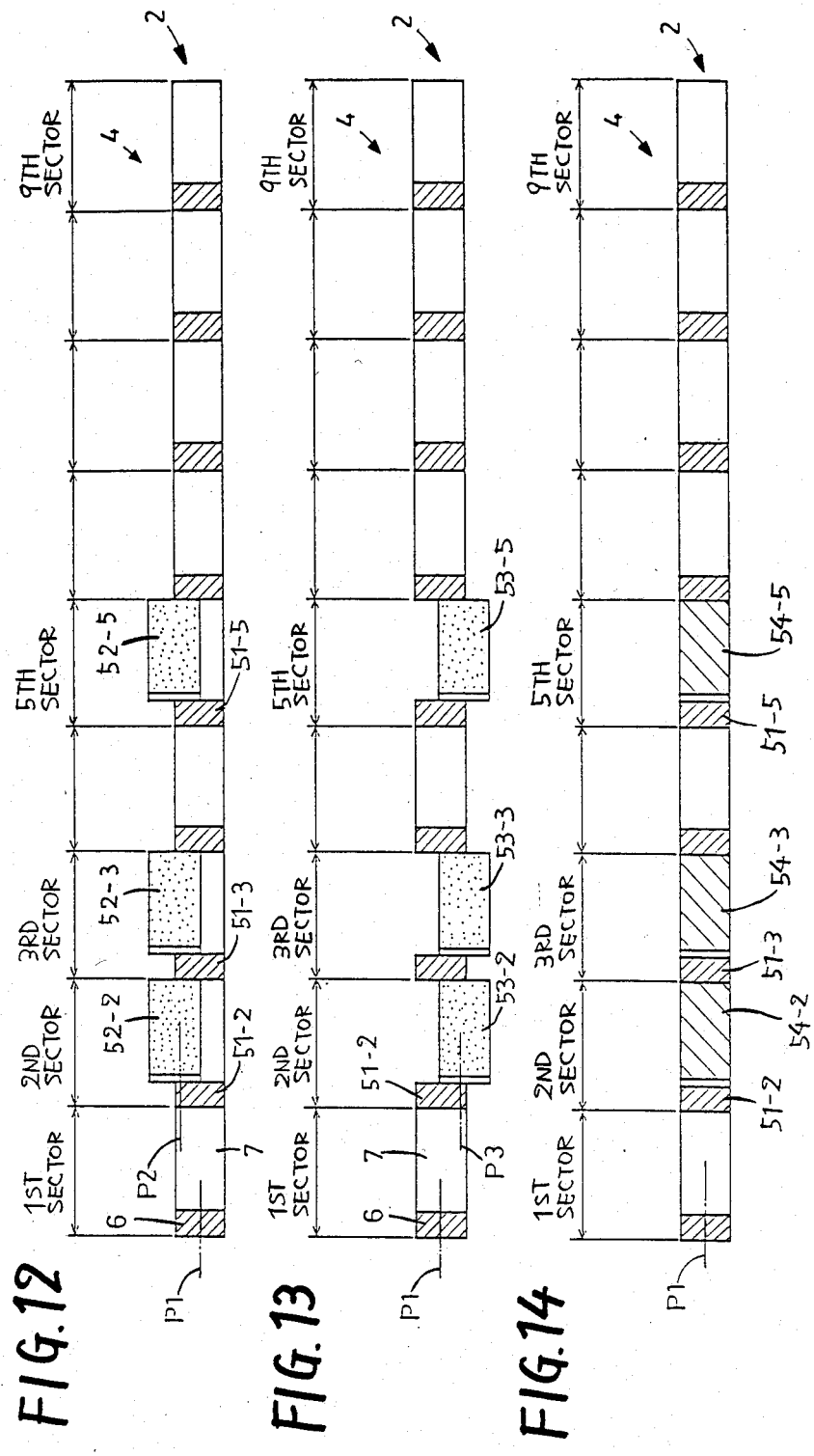

METHOD AND APPARATUS FOR WRITING INFORMATION ON MAGNETIC DISK WITH SINGLE-GAP MAGNETIC HEAD

BACKGROUND OF THE INVENTION

1. Field of the Invention

The present invention relates in general to a method and apparatus adapted for writing information on magnetic storage media in the form of a magnetic disk, and more particularly to such method and apparatus, wherein the magnetic disks have sector-identification fields identifying individual sectors of each recording track, and wherein a simple single-gap magnetic recording head is used for writing and reading operations.

2. Discussion of the Prior Art

As shown in FIG. 15, a magnetic disk 1 such as a floppy disk has a multiplicity of concentric recording tracks 2 (only one track shown in the figure). Each track 2 has an index position at which an index pulse 10 is generated to indicate a start position of the track 2. The track 2 has a preamble portion 3 starting with the index position, a plurality of arcuate sectors 4 (nine sectors of equal length, in this specific example) following the preamble portion 3, and a trailer portion 5 between the last sector 4 and the index position. Each of the sectors 4 includes a sector-identification field (hereinafter referred to as ID field) 6 storing sector identification data (sector address, etc.) identifying the particular sector, and a data field 7 in which information is written. To allow for variations in the position of the data field due to angular positioning errors and dimensional errors, difference or changes of the disk 1, there are provided a leading and a trailing gap 8, 8 between the ID field 6 and the leading and trailing ends of the data field 7. When a blank magnetic disk 1 is initially used, the disk 1 is initialized to prerecord the format described above, on all of the recording tracks 2 provided between the inner central portion of the disk 1 and its outer periphery.

Misalignment of a magnetic recording head with respect to a given track in the radial direction of the magnetic disk 1, will cause remnant signals being left when new information is written on a previous recording on the track. In this case, the remnant signals may be read when the newly written information is read by the magnetic head. To avoid this inconvenience, there has been proposed to provide a guard band or erase track 9, 9 on both sides of the track 2. This guard band or erase track 9 may easily be formed by using a so-called "tunnel-erase" magnetic head with exclusive tunnel erase gaps. However, when it is desired to use a less expensive single-gap magnetic head having a simple construction, the head must be positioned to offset erase positions on both sides of the track 2, for providing the erase tracks 9, 9.

For example, the erase tracks 9, 9 are formed after new information is written on previously recorded information on the track 2. More specifically, the single-gap magnetic head is moved to a first offset position on one side of the newly recorded track 2, which is intermediate between the recorded track 2 and one of the two adjacent tracks. Then, the head is moved to a second offset position intermediate between the recorded track 2 and the other adjacent track. Since the magnetic head located in the first and second offset positions cannot read the sector identification data in the ID fields 6 of the sectors 4, the erase tracks 9, 9 are formed over the entire length of the track 2. Namely, not only the data field but also the ID field of each sector are partially erased at their edge portions.

In the above erasing method, the width of the newly recorded track 2 after the erase tracks 9, 9 are formed is reduced, as compared with the original record width of the track 2 before the erase tracks are formed, as indicated in FIG. 16. In particular, the ID fields 6 whose sector identification data is never re-recorded once initially prerecorded tend to suffer from a progressive reduction in its width during repetitive writing operations on the disk 1 on one recording machine and other machines, due to positioning variations of the magnetic heads relative to the tracks 2 in the radial direction of the disk 1. Therefore, the tolerances in the level of the recorded signals obtained upon reading thereof and in the positioning accuracy are accordingly diminished, causing a problem where the magnetic disks 1 are interchangeable in different recording systems. To maintain a high level of interchangeability of the magnetic disks 1, the recording systems must provide a sophisticated arrangement for positioning the magnetic head relative to the disks.

SUMMARY OF THE INVENTION

It is therefore a first object of the present invention to provide a method of writing information on a magnetic disk with sector identification fields, by means of a single-gap magnetic head, which method is free from reduction in the width of recording on a track as a result of erasure on both sides of the track, and which assures high level of reading tolerances and interchangeability of the magnetic disk between different recording systems.

A second object of the invention is the provision of an apparatus suitable for practicing the above method of the invention.

The first object may be achieved according to the present invention, which provides a method of writing information on a magnetic disk having a multiplicity of concentric recording tracks on a recording surface thereof, by means of a single-gap magnetic head which is moved along the recording surface of the magnetic disk in a substantially radial direction of the disk, and is thus positioned at selected one of the recording tracks, each of the recording tracks having at least one sector each of which includes a sector-identification field storing sector identification data identifying the each sector, each sector further including a data field on which the information is written, the method comprising a first erasing step, a second erasing step and a writing step, which are performed in the order of description.

In the first erasing step, the magnetic head is moved to a first erase position of the selected track which is deviated away from a centerline of the selected track by a predetermined distance in one of radially inward and outward directions of the disk. After reading the sector-identification field of selected one of the at least one sector of the selected track, the magnetic head is activated to perform a first erasing operation on the data field of the selected sector.

In the second erasing step, the magnetic head is moved from the first erase position to a second erase position of the selected track which is away from the centerline by a predetermined distance in the other of the radially inward and outward directions. After reading the sector-identification field of the selected sector, the magnetic head is activated to perform a second erasing operation on the data field of the selected sector.

In the writing step following the second erasing step, comprising moving the magnetic head to the centerline of the selected track. After reading the sector-identification field of the selected sector, the magnetic head is activated to write the information on the erased data field of the selected sector.

The distances between the centerline of the selected track and the first and second erase positions are determined so that the magnetic head placed in these offset erase positions may read the sector-identification data in the ID field of the sector. These offset distances must be large enough to accommodate a possible positioning error of the magnetic head.

In the instant method according to the present invention described above, a writing operation is implemented after the first and second erasing operations have been performed with the magnetic head placed in the first and second offset erase positions, whereby the written information will not be erased, or the width of the recorded track will not be reduced. Further, the erasing operations are effected only in the data field of each sector. Namely, the erasing operations will not occur in the ID field. Therefore, the edge portions of the ID field will not be erased even if a writing operation is performed on a recording apparatus which is different from a recording apparatus by which the magnetic disk was initially loaded with the format data such as sector-identification data. Thus, the present method assures a complete freedom from undesirable reduction of the width of the ID field and the data field of each sector, which permits improved reading tolerances to allow for variations in the position of the magnetic head relative to the nominal centerline of the tracks, and improved interchangeability of the recording media (magnetic disks) in use between different recording systems.

According to one feature of the invention, each recording track includes a plurality of sectors, and the first erasing step is initially implemented for all of a selected plurality of the sectors. Then, the second erasing step is implemented for all of the selected plurality of sectors. Subsequently, the writing step is implemented for all of the selected sectors. In this arrangement, the first erasing operation for the data field of all selected sectors on which the desired information is written may be accomplished during one full rotation of the disk. Similarly, the second erasing operation for all selected sectors may be carried out during another one rotation of the disk. The writing operation is then performed during the third rotation of the disk. Thus, the writing operation and the preceding erasing operations may be completed with a total of three rotations of the magnetic disk, whereby the time required for writing the desired information may be considerably reduced, even if the magnetic head has a single gap.

In the above case, the method may further comprise a step of determining the selected plurality of sectors based on a length of the information to be written on the selected track, before the first and second erasing steps are executed.

According to another feature of the invention, each of the first and second erasing steps comprises: checking if the sector-identification field has been read by the magnetic head; skipping the first erasing operation if the magnetic head has failed to read the sector-identification field in the first erasing step; and skipping the second erasing operation if the magnetic head has failed to read the sector-identification field in the second erasing step. This arrangement is effective for preventing a partial erasure of the tracks adjacent to the track of interest.

According to a further feature of the invention, each sector further includes a trailing gap adjacent to a trailing end of the data field. In this case, the instant method further comprises a step of determining an active time of the magnetic head during which a signal is applied to the magnetic head to allow the magnetic head to perform the first and second erasing operations, and a writing operation, such that the active time is a sum of a first time necessary for the data field to pass the magnetic head, and an additional time which is shorter than a second time necessary for the trailing gap to pass the magnetic head. This arrangement is effective for preventing the previously recorded signals from being left following the trailing end of the new recording near the trailing end of the data field, since the magnetic head is kept in a writing mode even after the time necessary to write the desired information on the data field has elapsed. Namely, the magnetic head is placed in an erase mode after that time, since no information to be written is sent to the magnetic head.

The second object may be achieved by another aspect of the present invention, which provides an apparatus for writing information on a magnetic disk having a multiplicity of concentric recording tracks on a recording surface thereof, each of the recording tracks having at least one sector each of which includes a sector-identification field storing sector identification data indentifying the each sector, each sector further including a data field on which the information is written, the apparatus comprising: (a) a disk-drive device for rotating the magnetic disk; (b) a single-gap magnetic head for writing, reading and erasing information on selected one of the multiplicity of recording tracks; (c) a head-positioning device for moving the magnetic head along the recording surface of the magnetic disk in a substantially radial direction of the disk; (d) head-position control means for controlling the head-positioning device, to position the magnetic head at a centerline of the selected track, at a first erase position of the selected track which is away from the centerline of the selected track by a predetermined distance in one of radially inward and outward directions of the disk, and at a second erase position of the selected track which is away from the centerline by a predetermined distance in the other of the radially inward and outward directions; and (e) erase/write control means connected to the disk-drive device, the magnetic head and the head-position control means. The erase/write control means is adpated to (1) activate the magnetic head in the first erase position, for performing a first erasing operation on the data field of selected one of the at least one sector of the selected track, after the sector-identification field of the selected sector has passed the magnetic head, (2) activate the magnetic head in the second erase position, for performing a second erasing operation on the data field of the selected sector, after the sector-identification field of the selected sector has passed the magnetic head, and (3) activate the magnetic head in the centerline of the selected track, for writing the information on the erased data field of the selected sector, after the sector-identification field of the selected sector has passed the magnetic head.

The information writing apparatus of the present invention constructed as described above enjoys the same advantages as offered by the method of the invention descussed previously.

In accordance with one feature of the above apparatus, where each recording track includes a plurality of sectors, the erase/write control means is operable for activating the magnetic head to initially perform the first erasing operation for all of a selected plurality of the sectors, then perform the second erasing operation for the all of the selected plurality of sectors, and subsequently writing the information on the all selected sectors. In this instance, the apparatus may further comprise means for determining the selected plurality of sectors based on a length of the information to be written on the selected track, before the first and second erasing operations are carried out.

In accordance with another feature of the apparatus of the invention, the erase/write control means is adapted to check if the sector-identification field has been read by the magnetic head, skips the first erasing operation if the magnetic head in the first erase position has failed to read the sector-identification field, and skips the second erasing operation if the magnetic head in the second erase position has failed to read the sector-identification field.

Each of the sectors may further includes a trailing gap adjacent to a trailing end of the data field. In this case, the erase/write control means may be adapted to a signal to the magnetic head to allow the magnetic head to perform the first and second erasing operations, and a writing operation, for a length of time which is a sum of a first time necessary for the data field to pass the magnetic head, and an additional time which is shorter than a second time necessary for the trailing gap to pass the magnetic head.

BRIEF DESCRIPTION OF THE DRAWINGS

The above and other objects, features and advantages of the present invention will become more apparent by reading the following detailed description of preferred embodiments of the invention, when considered in connection with the accompanying drawings, in which:

FIGS. 12, 13 and 14 are illustrations indicating locations of erasing and writing operations in the embodiment of FIG. 11;

DETAILED DESCRIPTION OF THE PREFERRED EMBODIMENTS

Figure 1:
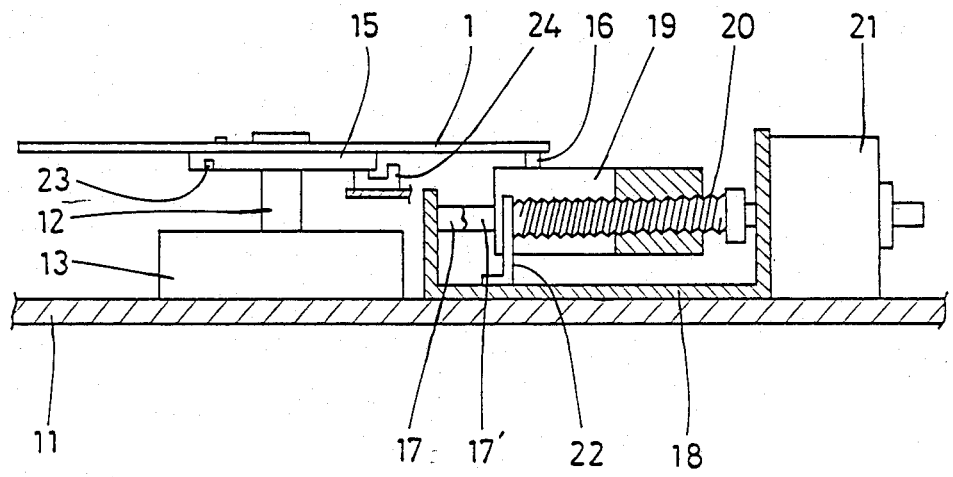
FIG. 1 is a fragmentary front elevational view in cross section of a mechanical arrangement of one embodiment of an information writing apparatus of the present invention.

Referring first to FIG. 1 showing a part of a magnetic information recording apparatus embodying the concept of the present invention, there is shown a disk-drive motor 13 mounted on a base 11 such that an output shaft 12 extends upright perpendicularly to the base 11. The output shaft 12 has a circular support 15 secured at its upper end, on which is mounted a magnetic disk 1 such as a hard disk or a flopply or flexible disk. The magnetic disk 1 is rotated at a predetermined speed by the disk-drive motor 13, in a plane parallel to the base 11. A single-gap magnetic read/write head 16 is disposed so that it is moved along a recording surface of the magnetic disk 1 in radially inward and outward directions of the disk 1 toward and away from the center. Described more specifically, a pair of parallel guide rods 17, 17' are supported by a support frame 18 such that the guide rods 17, 17' lie in a plane parallel to the base 11. The guide rods 17, 17' are thus adapted to slidably support and guide a carriage 19 which carries the magnetic head 16 fixed thereto. To the support frame 19, there is secured a head-positioning stepping motor 21 for rotating a leadscrew 20 which extends in parallel with the guide rods 17, 17'. The leadscrew 20 is held in engagement with an internal thread formed in the carriage 19, so that the carriage 19 is moved by rotation of the leadscrew 20. To avoid an axial displacement due to an axial play of the output shaft of the stepping motor 21, a sheet spring 22 is disposed to bias the leadscrew 20 in the axial direction toward the stepping motor 21. In this arrangement, a rotating motion of the stepping motor 21 will cause the magnetic head 16 to be moved in the radial direction of the magnetic disk 1, whereby the magnetic head 16 may be positioned to a desired radial position on the disk 1, i.e., to selected one of a multiplicity of concentric recording tracks 2. The stepping motor 21 is of a two-phase exitation type having two sets of coils. The pitch of the leadscrew 20 is so determined that a rotating angle of the output shaft of the motor 21 corresponding to four steps of the motor permits the magnetic head 16 to be moved one track position, i.e., from one track to the next track. The magnetic head 1 is movable over a maximum distance corresponding to 80 tracks, from the radially outermost track #0 to the innermost track #79.

The circular support 15 for supporting the magnetic disk 1 has an INDEX slit 23 formed in the outer peripheral surface. A photocoupler 24 including a light emitting diode and a phototransistor is disposed on a suitable portion of the base 11, so that the INDEX slit 23 may be detected by the photocoupler 24. Upon detection of the INDEX slit 23, the photocoupler 24 generates an INDEX signal indicative of a start or index position of the magnetic disk 1 corresponding to the INDEX slit 23.

Figure 2:
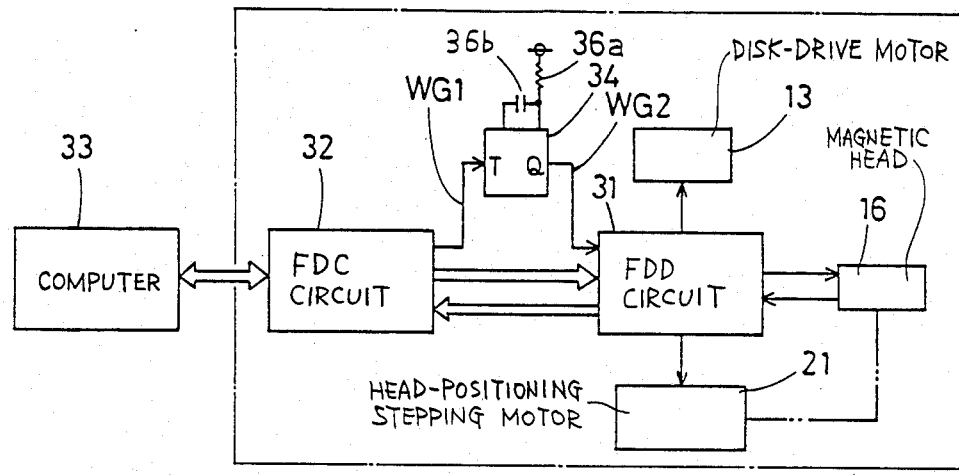
FIG. 2 is a schematic block diagram showing a general control arrangement of the writing apparatus of FIG. 1.

Referring next to FIG. 2 showing a general control arrangement of the apparatus, reference numeral 31 designates a DRIVER circuit (hereinafter referred as to FDD circuit) whose major portion consists of a single integrated circuit package (for example, M51017AP available from MITSUBISHI DENKI K.K.), which incorporates a READ circuit, a WRITE circuit, a drive signal generator circuit (for the stepping motor 21), a modulation-demodulation circuit, and a logic circuit.

The FDD circuit 31 directly drives the coils of the magnetic head 16, and drives the stepping motor 21 and the disk-drive motor 13, via a driver circuit consisting of a power transistor (not shown) as known in the art. The FDD circuit 31 is controlled by a DRIVER CONTROL circuit 32 (hereinafter referred to as FDC circuit).

A major portion of the FDC circuit 32 consists of a single integrated circuit package (for example, M5W1793-02P available from MITSUBISHI DENKI K.K.) which incorporates an interface, an arithmetic circuit, and various registers. The FDC circuit 32 is connected to a computer 33, through data buses, and various control lines for interruption and other purposes, in order to control the FDD circuit 31 in response to signals from the computer 33.

The FDC circuit 32 supplies the FDD circuit 31 with a ROTATION signal for operating the disk-drive motor 13, a DIRECTION signal designating a direction of movement of the magnetic head 16, a WRITE DATA signal (signal WD) representative of the information to be written on the magnetic disk 1, STEP PULSE signal indicative of the number of steps of the head-positioning stepping motor 21, and a WRITE GATE signal (signal WG) which enables the coils of the magnetic head 16 to be energized. On the other hand, the FDD circuit 31 supplies the FDC circuit 32 with the INDEX signal indivative of the index position of the magnetic disk 1, a READ DATA signal (signal RD) which is read out from the magnetic disk 1 by the magnetic head 16, and other signals.

The time during which the WG signal is applied from the FDC circuit 32 to the FDD circuit 31 is extended by a timer circuit 34 by a predetermined time $\tau$. This extension time is determined to fall within a range of one fifth (1/5) to four fifths (4/5) of a time necessary for the trailing gap 8 of each sector 4 on each track 2 to pass the magnetic head 16. The predetermined extension time $\tau$ is determined by constants of a resistor 36$a$ and a capacitor 36$b$ of the timer circuit 34.

Figure 3:
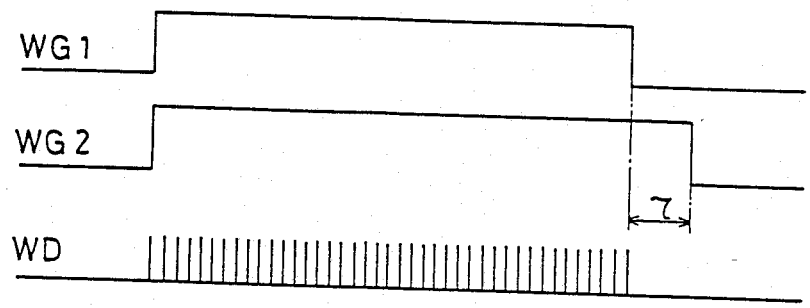
FIG. 3 is a timing chart showing a WRITE DATA signal and WRITE GATE signals.

Referring to FIG. 3, there are illustrated the WRITE DATA signal WD applied to the FDD circuit 31, a first WRITE GATE signal WG1 applied to the timer circuit 34 from the FDC circuit 32, and a second WRITE GATE signal WG2 applied to the FDD circuit 31 from the timer circuit 34.

Figure 4:
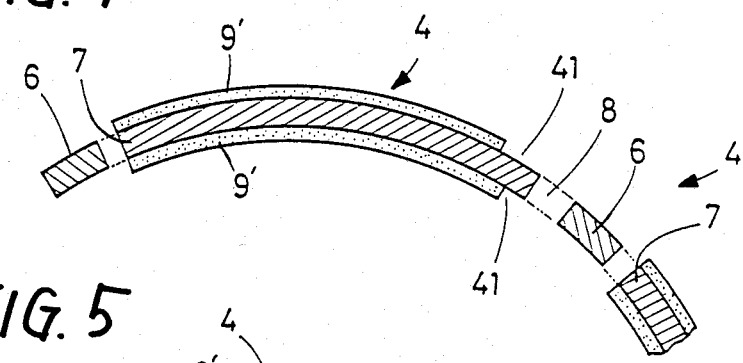
FIGS. 4 and 5 are illustrations showing part of a recording track on a magnetic disk.

The FDD circuit 31 is adapted to energize or activate the magnetic head 16 while the FDD circuit 31 receives the WRITE GATE signal WG. In the meantime, the FDC circuit 32 applies the first WRITE GATE signal WG1 to the timer circuit 34 for a length of time during which the FDC circuit 32 applies to the FDD circuit 31 the WRITE DATA signal WD received from the computer 33, which signal WD corresponds to the number of bytes of the information to be written on the data field 7 of the selected sector 4. Hence, if there exists a circumferential positioning error of the disk 1 due to wow or flutter of the disk-drive motor 13, it is possible that non-erased segments 41, 41 may be left on both sides of the trailing end portion of the data field 7, as indicated in FIG. 4.

Figure 5:
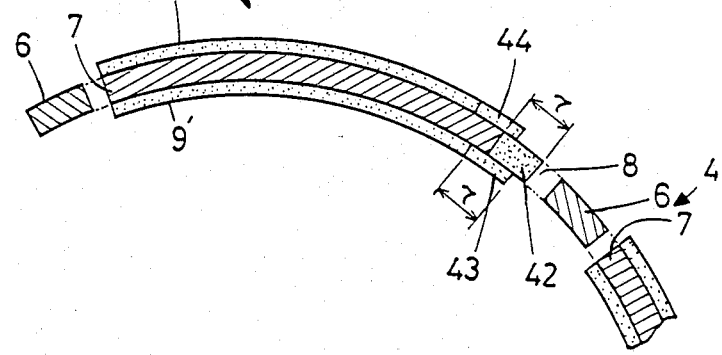

To overcome the above inconvenience, the timer circuit 34 discussed above is provided between the FDC and FDD circuit 32, 31. That is, the period during which the second WRITE GATE signal WG2 is applied from the timer circuit 34 to the FDD circuit 31, is extended by the predetermined time $\tau$, as indicated in FIG. 3. In this arrangement, therefore, the magnetic head 16 is kept energized or held in the write mode (erase mode) for the predetermined extension time even after the supply of the WRITE DATA signal WD to the FDD circuit 31 is terminated. Accordingly, a part of the trailing gap 8 adjacent to the trailing end of the data field 7 is erased by the magnetic head 16, as indicated at 42 in FIG. 5. Further, the erase tracks 9', 9' formed on both sides of the data field 7 (which will be described in detail) are also provided with additional erased segments 43, 44 at the trailing gap 8 at the end of the data field. Therefore, the non-erased segments 41, 41 will not be left. Since the extension time $\tau$ which corresponds to the length of the additional erased segments 42, 43, 44 is determined as explained above, these segments will be accommodated within the length of the trailing gap 8 between the trailing end of the data field 7 and the next ID field 6. That is, the additional erased segments 42, 43, 44 will not overlie the ID field 6 of the next sector 4.

Referring next to the flow chart of FIG. 6 and the illustrative view of FIG. 7, there will be described the operation of the instant apparatus to write information on a selected sector 4 which is loaded with previous information.

The recording tracks 2 of the magnetic disk 1 are equally spaced from each other so that a spacing between the centerlines of the adjacent tracks corresponds to four steps of the stepping motor 21. On the other hand, the width of the magnetic head 16, i.e., the width of recording by the head 16 is slightly larger than a distance corresponding to two steps of the stepping motor 21. As described below in greater detail, only the data field 7 of each sector 4 into which information is written is initially erased with the magnetic head 16 placed in a first and a second offset erase position P2, P3, which are distant from the centerline P1 of the track 2 in the radially outward and inward directions of the disk 1, by a distance corresponding to one step of the stepping motor 21. Then, the magnetic head 16 is moved back to the centerline P1, to write the desired information on the erased data field 7.

Figure 7:
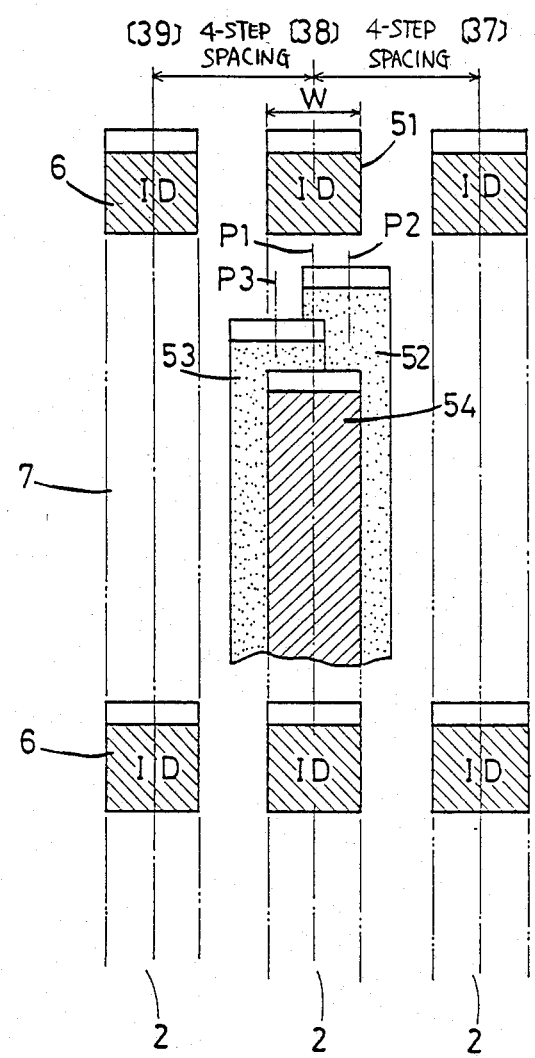
FIGS. 7 through 10 are illustrations indicating locations of erasing and writing operations on data field or fields on the magnetic disk.

When a writing routine in step 100 is started, step 101 is executed to position the magnetic head 16 at the centerline P1 of the track 2 of interest, e.g., track #38 as exemplified in FIG. 7. Step 101 is followed by step 102 wherein the magnetic head 16 is activated to read an ID field 51 of selected one of the nine sectors 4 of the track #38. The control then goes to step 103 to check if it is possible to read the ID field 51 of the selected sector. If the magnetic head 16 has failed to read the ID field 51, step 103 is followed by step 120 wherein an alarm is constituted, providing an indication of an operating error. Usually, this alarm indication is provided only after several attempts to find the ID field have revealed a failure of the magnetic head 16 to correctly read the sector-identification data recorded on the appropriate ID field.

If the ID field 51 of the selected sector has been read and verified, step 103 is followed by step 104 to operate the stepping motor 21 one step, thereby moving the magnetic head 16 in the radially outward direction P2 to the first offset erase position P2. In the next steps 105 and 106, the control again checks if the appropriate ID field 51 has been read or not. If not, the control goes to step 108, skipping step 107 as described later. Usually, however, the magnetic head 16 even when placed in its first offset position P2 is able to read the ID field 51, since the magnetic head 16 overlaps the width of the ID field 51 over a distance of more than one half of the width W of the head 16. In this condition, the signal level obtained by the magnetic head 16 as a result of reading the ID field 51 is more or less lowered, but the magnetic head 16 is generally still able to correctly find the ID field 51. Therefore, step 106 is usually followed by step 107 wherein the magnetic head in the first offset erase position P2 is activated to perform a first erasing operation. As a result, a first erased band 52 is formed following the ID field 51. The first erased band 52 covers the entire outer half of the data field, and a part of the outer guard band between the track #38 and the outer adjacent track #37, as indicated in FIG. 7. This first erasing operation will not be performed in the event where the checking in step 106 provides a negative answer.

In the next step 108, the head-positioning stepping motor 21 is operated two steps to increment the magnetic head 16 in the radially inward direction to the second offset erase position P3. Step 108 is followed by steps 109 and 110 to check the ID field 51 again. That is, the disk-drive motor 13 continues to operate so that the magnetic head 16 may find the ID field 51 in the next revolution of the disk 1. If the checking in step 110 reveals that the magnetic head 16 in the second offset position P3 has read the ID field 51, the control goes to step 111 wherein the magnetic head 16 is activated to perform a second erasing operation, whereby a second erased band 53 is created. If a negative answer is obtained in step 110, the control skips step 111 and directly goes to step 112.

In step 112, the stepping motor 21 is operated two steps to position the magnetic head 16 at the centerline P1 of the track 1 of interest. Step 112 is followed by step 113 to read and verify the ID field 51, and then to step 114 wherein the magnetic head 16 is activated to perform a writing operation, namely, to write the new information on the data field following the ID field 51. Thus, the data field is loaded with the new information, as indicated at 54 in FIG. 7. The control then goes to step 115 to terminate the writing routine.

As described above, the new data field 54 is formed only after the first and second erasing operations have been executed with the magnetic head 16 placed in the first and second offset positions P2 and P3, to provide the first and second erased bands 52, 53 on both sides of the centerline P1. Hence, the recording width of the data field 54 remains unchanged, that is, is equal to the effective recording width of the magnetic head 16.

Figure 8:
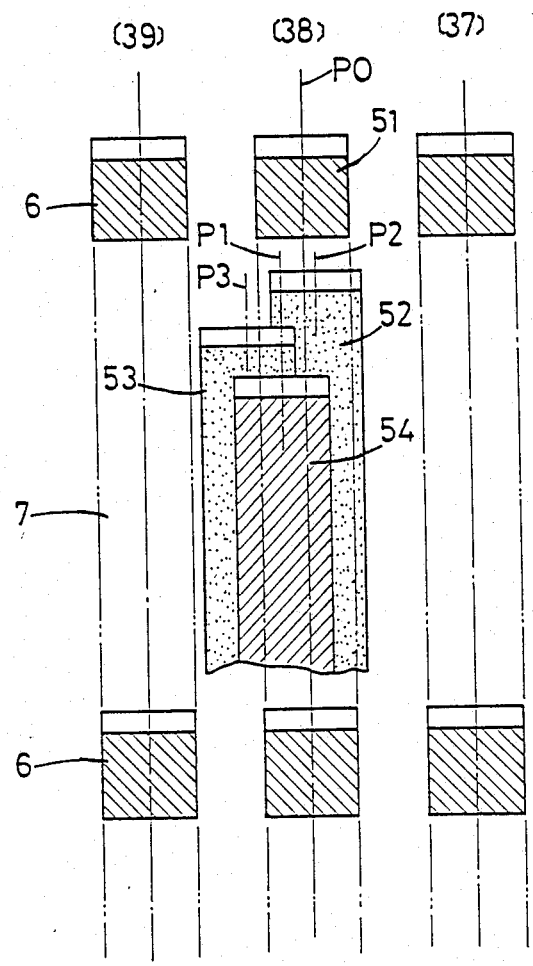
Figure 9:
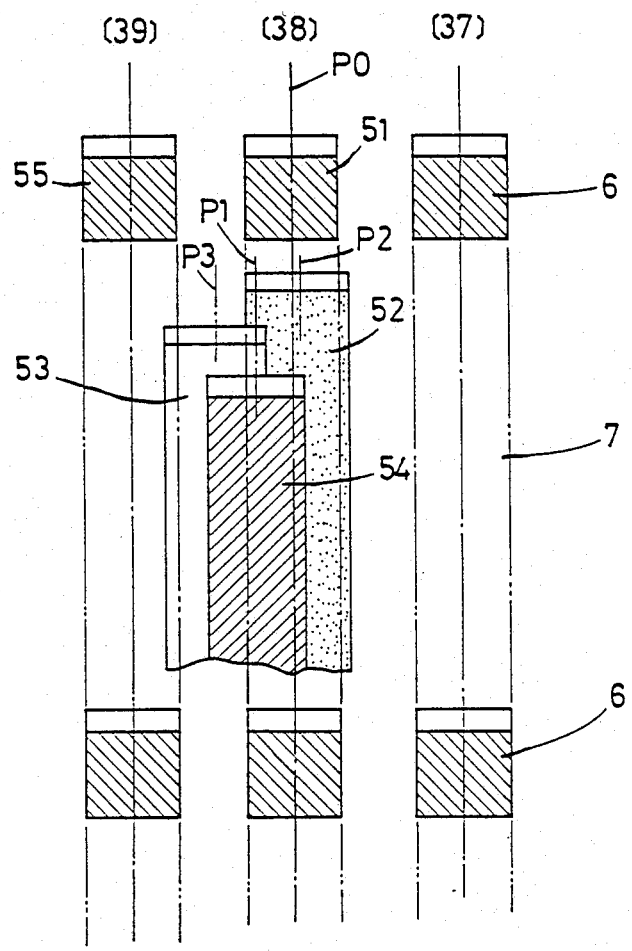

FIGS. 8 and 9 show a writing operation when performed on a machine different from the machine in which the magnetic disk 1 was initially loaded with the predetermined format data such as the sector-identification data on each ID field 6. Both machines are constructed according to the invention.

Where the formatting of the magnetic disk 1 is implemented on one machine while a writing operation is performed on another machine, there may arise a positioning error of the magnetic head 16 relative to the tracks 2, due to variations in the positioning accuracy of the leadscrew 20, etc. In other words, a command to position the magnetic head 16 to the centerline P1 of the track 1 may not result in positioning the magnetic head 16 at the centerline P0 of the track 2 (data field 51) which was established. In the case where the currently established centerline P1 (center of the currently positioned head 16) is deviated from the pre-established centerline P0 by a distance of about 30 microns, as illustrated in FIG. 8, the overlapping width of the magnetic head 16 in the second offset position P3 with respect to the ID field 51 is less than one third of the width of the head 16. In this case, the level of the ID signal obtained by the magnetic head 16 is considerably lowered to a critical level at which the ID field 51 may or may not be read for correct identification thereof. If the ID field 51 was read and correctly detected (in step 110 in FIG. 6), the second erasing operation in the offset position P3 is performed in the normal manner to provide the second erased band 53. However, if the magnetic head 16 in the second offset erase position P3 was not able to read the ID field 51, the second erasing operation is not executed. Namely, the previous recording is left on the inner half of the data field. Therefore, the new information is written on the partially erased data field, with the magnetic head 16 positioned at the centerline P1. In this case, too, the ID field 51 is not erased.

FIG. 9 shows a writing operation where the deviation of the centerline P1 from the pre-established centerline P0 is about 50 microns. In this case, the magnetic head 16 if offset to the second erase position P3 partially interferes with the inner adjacent track #39. Consequently, the sector-identification data in the ID field 55 of the adjacent track #39 is also read by the magnetic head 16 in step 109, whereby the checking in step 110 gives a negative answer, causing the control to skip step 111. Accordingly, the second erasing operation in the second offset position P3 will not be implemented, whereby the second erased band 53 will not be formed. Thus, the magnetic head 16 will not partially erase the adjacent track #39.

Figure 10:
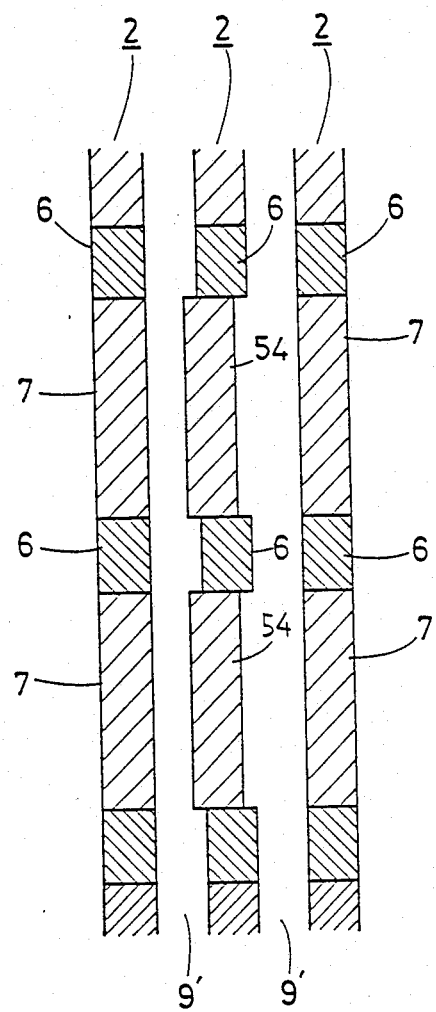

In the manner described above, desired information may be written on each data field 7. FIG. 10 illustrates newly written data fields 54 of a track 2. Since the ID fields 6 are not at all erased, the width of the ID fields remain unchanged (equal to the nominal width of the track 2) even after the first and second erasing operations are carried out. The newly formed data fields 54, may be displaced relative to the centerline of the track 2 (data fields 54) by a small distance. However, the width of the new data fields 54 remains equal to the width of the magnetic head 16. Further, the adjacent tracks will not be partially erased by the erased bands 9', 9'. When the thus recorded track 2 is read by the magnetic head 16 on a different machine, the magnetic head 16 positioned for reading the ID fields 6 and data fields 54 may be more or less misaligned from the centerline of the track 2. Since the widths of the ID fields 6 and data fields 54 are not reduced as a result of the erasing operations upon writing the information, the width of overlap of the magnetic head 16 on the ID and data fields 6, 54 is sufficient to provide a large tolerance to allow for variations in the position of the magnetic head 16 relative to the centerline of the track 2, upon reading the recorded information.

Figure 6:
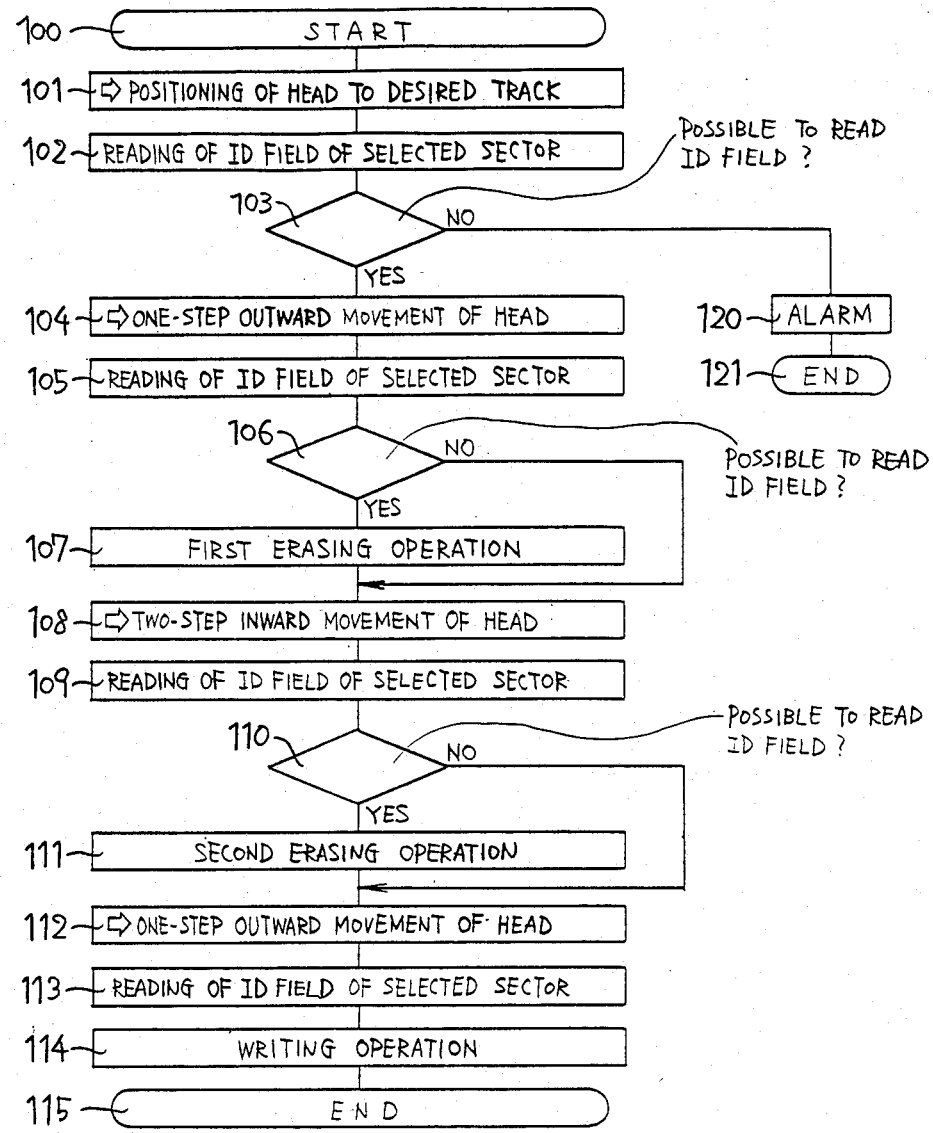
FIG. 6 is a flow chart showing an operation of the writing apparatus.

In the illustrated embodiment of FIGS. 6 and 7, the desired information is written on one of the nine sectors 4 of one of the tracks 2, for illustrative purpose only. Actually, however, the information to be written consists of two or more sectors of information, requiring two or more sectors 4 of a track, and sometimes two or more tracks 2.

Figure 11A:
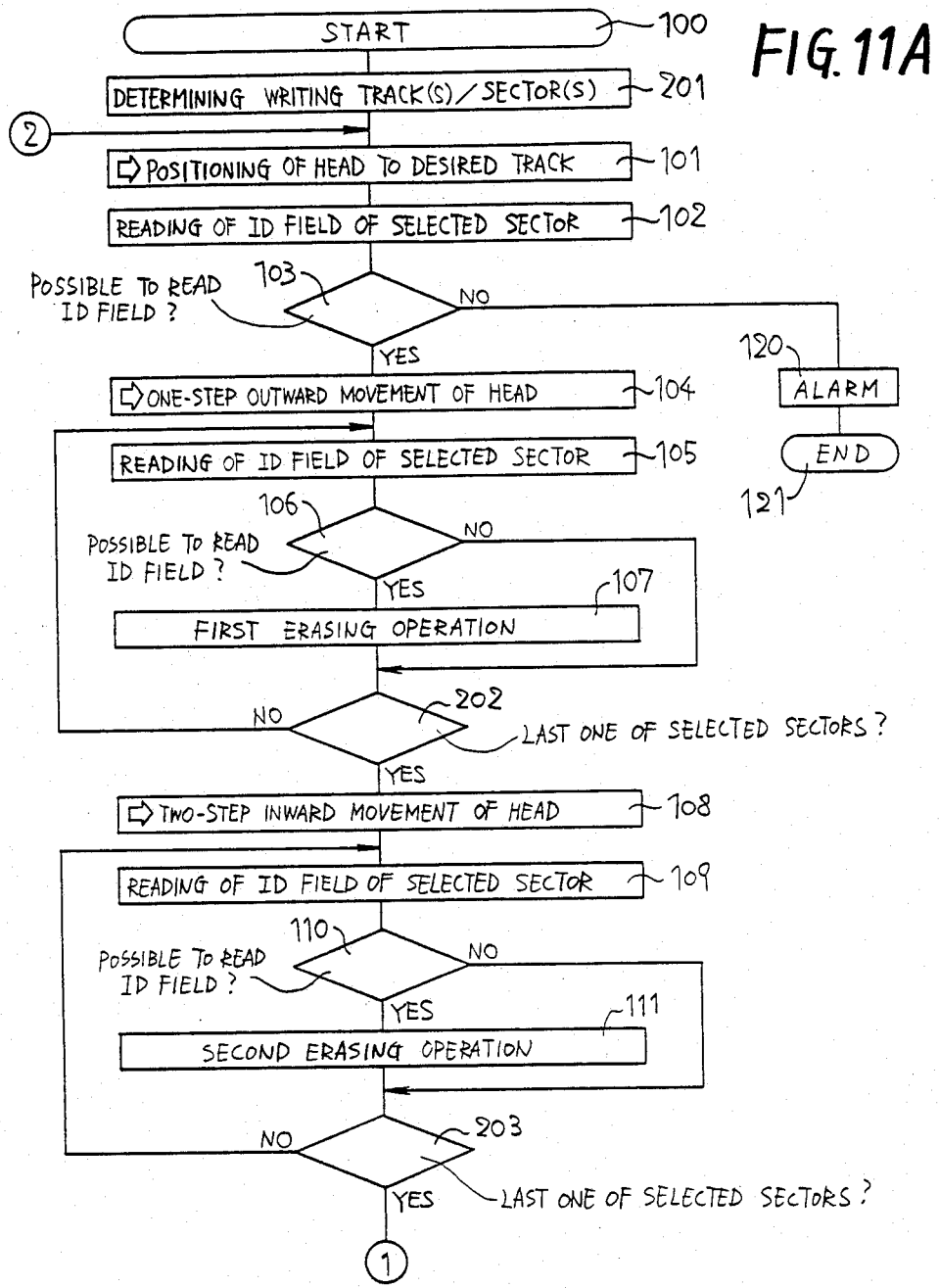
FIG. 11A and 11B are flow charts showing an operation of another embodiment of the present invention.
Figure 11B:
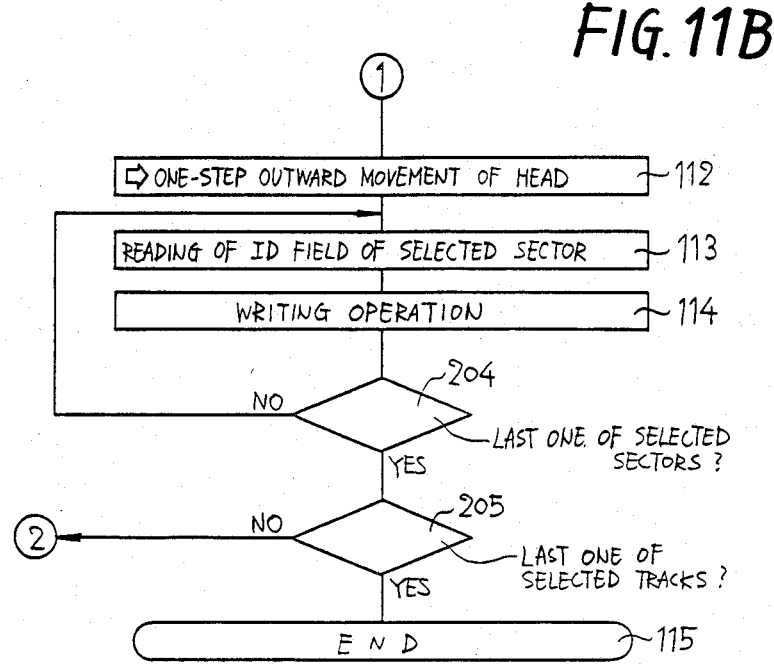
Figure 15:
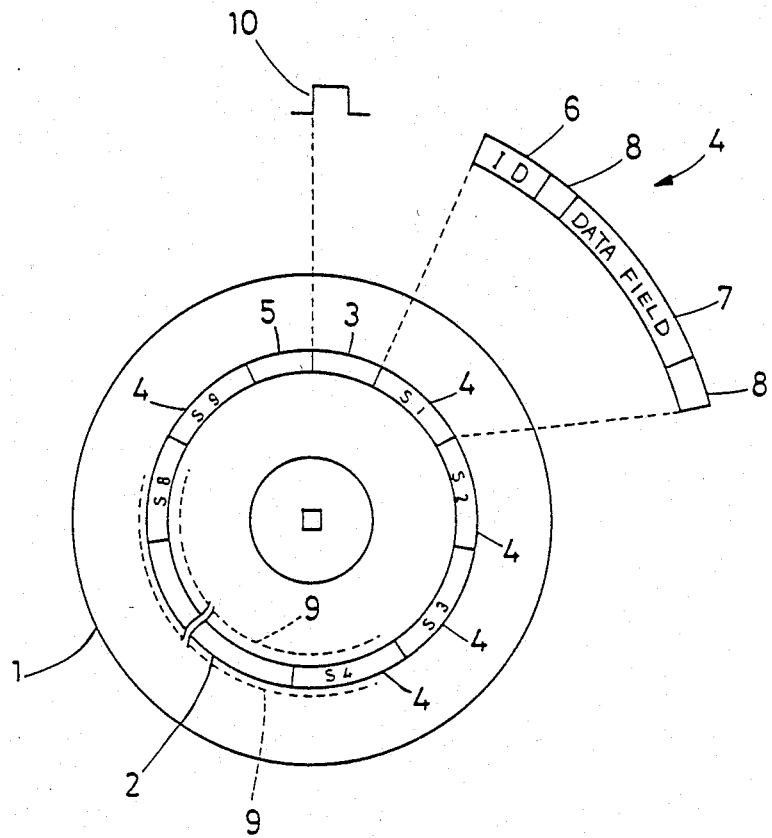
FIG. 15 is a schematic plan view illustrating an arrangement of a recording track on the magnetic disk.
Figure 16:
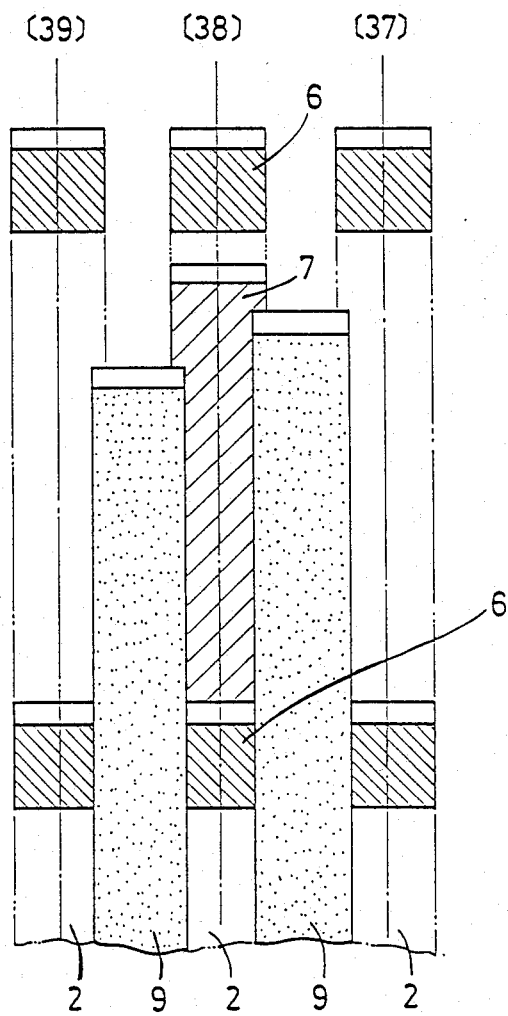
FIG. 16 is an illustration showing locations of erasing and writing operations in a conventional method.

Referring now to FIGS. 11-14, there will be described another embodiment of the invention wherein information is written on a selected plurality of sectors of a given track 2, e.g., on the second, third and fifth sectors of the track 2. In FIG. 11, the same step numbers as used in FIG. 6 are used to identify the corresponding steps.

This embodiment is different from the preceding embodiment in that steps 201-205 are additionally executed in the present embodiment. In the interest of brevity and simplification, only the additional steps 201-205 will be described.

Upon initiation of the writing routine, the control first goes to step 201 to determines the track or tracks 2 and the sectors 4 into which information is written, based on a length of the information. In this example, the information is written on the second, third and fifth sectors 4 of one track, as previously indicated. After the determination of the writing locations, the control goes to step 101 in which the magnetic head 16 is positioned at the track of interest, and to steps 102 and 103 to find the second sector of the track by reading the corresponding ID field 51-2 as indicated in FIG. 12. Immediately after reading the ID field 51-2 of the second sector, the previously described steps 104, 105, 106 and 107 are implemented to perform the first erasing operation on the second sector. Thus, a first erased band 52-2 is formed as indicated in FIG. 12.

Step 107 is followed by step 202 in which the control checks if the first erasing operation has been completed for all of the selected sectors. Since the second sector is not the last sector of the selected three sectors (second, third and fifth sectors), a negative answer is given in step 202, whereby the control goes back to step 105 to find the next sector, i.e., read the ID field 51-3 of the third sector. Thus, the steps 102-107 are repeated until the first erasing operation has been completed for all of the three selected sectors. In this manner, the first erased bands 52-2, 52-3 and 52-5 are formed on the radially outer side of the second, third and fifth sectors of the selected track, as illustrated in FIG. 12, during one revolution of the magnetic disk 1.

Subsequently, step 202 is followed by the previously described steps 108-111, in order to form a second erased band 53-2 on the radially inner side of the second sector of the track of interest, as shown in FIG. 13. These steps are repeated until the second erasing operation has been completed for all of the second, third and fifth sectors, or until a second erased band 53-5 for the fifth sector has been created, that is, until step 203 following the step 111 gives an affirmative answer. This second erasing operation to provide the second erased bands 53-2, 53-3 and 53-5 is accomplished during another revolution of the magnetic disk 1. Step 203 is followed by the previously described step 112 after the second erased band 53-5 for the fifth sector has been formed.

In step 112, the stepping motor 21 is operated one step to position the magnetic head 16 at the centerline P1. Then, the previously described steps 113-114 are repeatedly executed to perform a writing operation successively on the data fields of the second, third and fifth sectors of the track. That is, step 114 is followed by step 204 to check if the writing operation has been completed on all of the data fields of all the selected sectors. Thus, the data fields of the second, third and fifth sectors of the track are loaded with new information, as indicated at 54-2, 54-3 and 54-5 in FIG. 14, during one revolution of the disk 1.

When the writing operation on the data field 54-5 of the fifth sector has been terminated, step 204 is followed by step 205 to check if the writing operation has been performed on all of the tracks 2 selected in step 201. If not, the control goes back to step 101 to start a writing operation on the second one of the selected tracks. Thus, the above-described first and second erasing operations, and the writing operation are repeatedly performed for the second and subsequent tracks of interest, if any.

As described above, the operation to record the information on the second, third and fifth sectors of the first track illustrated in FIGS. 12-14 requires only three revolutions of the magnetic disk 1: first revolution for the first erasing operation with the head 16 located in the first offset position P2; second revolution for the second erasing operation with the head 16 located in the second offset position P3; and third revolution for the writing operation with the head 16 located at the centerline P1 of the track 2. This is contrary to a total of nine revolutions required in a conventional arrangement wherein a recording on each sector requires three revolutions of the magnetic disk. Hence, the information writing apparatus or method according to this embodiment is effective in improving the writing efficiency.

What is claimed is:

1. A method of writing information on a magnetic disk having a multiplicity of concentric recording tracks on a recording surface thereof, by means of a single-gap magnetic head which is moved along the recording surface of said magnetic disk in a substantially radial direction of the disk, and is thus positioned at a selected one of said recording tracks, each of said recording tracks having at least one sector each including a sector-identification field storing sector identification data identifying each respective sector, each sector further including a data field on which the information is written, said method comprising:

a first erasing step comprising positioning said magnetic head at a first erase position of said selected track which is displaced from a centerline of the selected track by a predetermined distance in one of radially inward and outward directions of the disk, causing said magnetic head to read the sector-identification field of a selected one of said at least one sector of the selected track, and then activating said magnetic head to perform a first erasing operation on the data field of said selected sector;

a second erasing step following said first erasing step, comprising moving said magnetic head from said first erase position to a second erase position of said selected track which is displaced from said centerline by a predetermined distance in the other of said radially inward and outward directions, causing said magnetic head to read the sector-identification field of said selected sector, and then activating said magnetic head to perform a second erasing operation on the data field of said selected sector; and a writing step following said second erasing step, comprising moving said magnetic head to said centerline of said selected track, causing said magnetic head to read the sector-identification field of said selected sector, and then activating said magnetic head to write said information on the erased data field of said selected sector.

2. A method according to claim 1, wherein each said recording track includes a plurality of sectors, said first erasing step being initially implemented for all of a selected plurality of said plurality of sectors, and then said second erasing step being implemented for said all of the selected plurality of sectors, said writing step being subsequently implemented for said all selected sectors.

3. A method according to claim 2, further comprising step of determining said selected plurality of sectors based on a length of said information to be written on said selected track, before said first and second erasing steps.

4. A method according to claim 1, wherein each of said first and second erasing steps comprises checking if said sector-identification field has been read by said magnetic head, skipping said first erasing operation if said magnetic head has failed to read said sector-identification field in said first erasing step, and skipping said second erasing operation if said magnetic head has failed to read said sector-identification field in said second erasing step.

5. A method according to claim 1, wherein each said sector further includes a trailing gap adjacent to a trailing end of said data field, said method further comprising determining an active time of said magnetic head during which a signal is applied to the magnetic head to allow the magnetic head to perform said first and second erasing operations, and a writing operation, such that said active time is a sum of a first time necessary for said data field to pass said magnetic head, and an additional time which is shorter than a second time necessary for said trailing gap to pass said magnetic head.

6. An apparatus for writing information on a magnetic disk having a multiplicity of concentric recording tracks on a recording surface thereof, each of said recording tracks having at least one sector each including a sector-identification field storing sector identification data identifying each respective sector, each sector further including a data field on which the information is written, said apparatus comprising:

a disk-drive device for rotating said magnetic disk;

a single-gap magnetic head for writing, reading and erasing information on a selected one of said multiplicity of recording tracks;

a head-positioning device for moving said magnetic head along the recording surface of said magnetic disk in a substantially radial direction of the disk;

head-position control means for controlling said head-positioning device, to position said magnetic head at a centerline of said selected track, at a first erase position of said selected track which is displaced from said centerline of the selected track by a predetermined distance in one of radially inward and outward directions of the disk, and at a second erase position of said selected track which is displaced from said centerline by a predetermined distance in the other of said radially inward and outward directions; and erase/write control means connected to said disk-drive device, said magnetic head and said head-position control means, operable for (a) activating said magnetic head in said first erase position, to perform a first erasing operation on the data field of a selected one of said at least one sector of said selected track, after the sector-identification field of said selected sector has passed said magnetic head, (b) activating said magnetic head in said second erase position, to perform a second erasing operation on the data field of said selected sector, after the sector-identification field of said selected sector has passed said magnetic head, and (c) activating said magnetic head at said centerline of the selected track, to write said information on the erased data field of said selected sector, after the sector-identification field of said selected sector has passed said magnetic head.

7. An apparatus according to claim 6, wherein each recording track includes a plurality of sectors, said erase/write control means being operable for activating said magnetic head initially to perform said first erasing operation for all of a selected plurality of said plurality of sectors, then to perform said second erasing operation for said all of the selected plurality of sectors, and subsequently to write the information on said all of the selected plurality of sectors.

8. An apparatus according to claim 7, further comprising means for determining said selected plurality of sectors based on a length of said information to be written on said selected track, before said first and second erasing operations.

9. An apparatus according to claim 6, wherein said erase/write control means checks if said sector-identification field has been read by said magnetic head, skips said first erasing operation if said magnetic head in said first erase position has failed to read said sector-identification field, and skips said second erasing operation if said magnetic head in said second erase position has failed to read said sector-identification field.

10. An apparatus according to claim 6, wherein said each sector further includes a trailing gap adjacent to a trailing end of said data field, said erase/write control means applying a signal to said magnetic head to allow the magnetic head to perform said first and second erasing operations, and a writing operation, for a length of time which is a sum of a first time necessary for said data field to pass said magnetic head, and an additional time which is shorter than a second time necessary for said trailing gap to pass said magnetic head.

* * * * *